Nov. 10, 1936.    L. G. S. BROOKER    2,060,023
PHOTOGRAPHIC EMULSIONS CONTAINING 7-ALKYL-THIO ISO- AND PSEUDO-CYANINES
Filed March 6, 1933
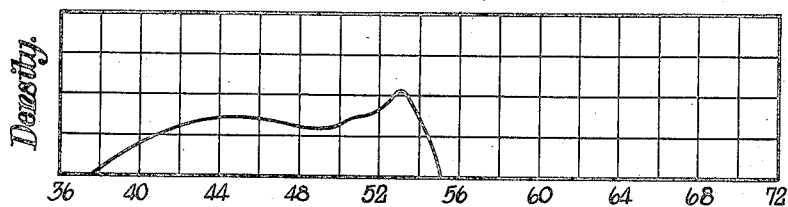
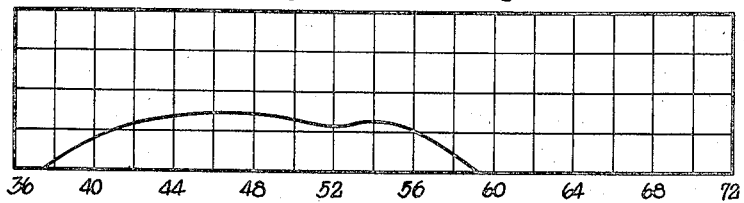
Inventor:
Leslie G. S. Brooker,
Daniel J. Mayne
Newton M. Perrus
By
Attorneys.

Patented Nov. 10, 1936

2,060,023

UNITED STATES PATENT OFFICE 2,060,023

PHOTOGRAPHIC EMULSIONS CONTAINING 7-ALKYL-THIO ISO- AND PSEUDO-CYANINES

Leslie G. S. Brooker, Rochester, N. Y., assignor, by mesne assignments, to Eastman Kodak Company, Jersey City, N. J., a corporation of New Jersey Application March 6, 1933, Serial No. 659,631

10 Claims. (Cl. 95—7)

This invention relates to new compositions of matter and particularly to a new class of photographic sensitizing dyes known as 7-alkyl thio iso- and pseudo-cyanines, a method for their preparation and photographic emulsions containing them.

Cyanine dyes of the thio-ψ-cyanine and thio-iso-cyanine series are well known, dyes of these series including a naphthothiazole nucleus, for instance, being described in my U. S. Patent No. 1,861,836. I have now prepared related dyes of a novel type. These possess the following general formulae

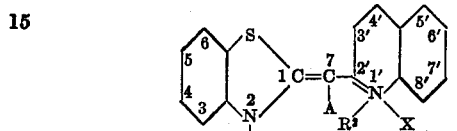

2,1'-dialkyl-7-alkyl thio-ψ-cyanine salt

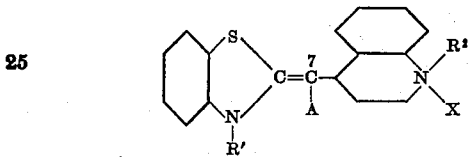

2,1'-dialkyl-7-alkyl thio-iso-cyanine salt in which formulae R' and R² are similar or dissimilar alkyl, X is an acidic radical and A is an alkyl group (preferably methyl) and are characterized by the 7-alkyl substituent.

Satisfactory methods of preparing these 7-substituted thio-ψ-cyanine and thio-iso-cyanine dyes have been described in my co-pending application No. 651,870.

The older methods of preparing thio-ψ-cyanine or thio-iso-cyanine dyes may be employed, in which alcoholic potassium hydroxide is used as a condensing agent, but triethylamine or an equivalent strong base is preferred for this purpose.

In the preparation of the 7-substituted dyes, it is necessary to start with an alkyl quaternary salt of a benzothiazole which contains a reactive substituted methyl group in the 1-position, the substituent in the 1-methyl group corresponding to the substituent A, which it is desired to introduce into the 7-position. For instance, 1-ethyl benzothiazole ethiodide

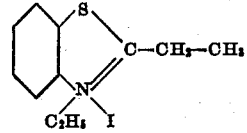

will give rise to dyes which will contain a 7-methyl group and a 2-ethyl group. Further details of the reaction are given in my co-pending application already mentioned and in the examples herewith.

In addition to the foregoing dyes, there may be obtained photographic sensitizing dyes of a new type, represented by the following general formula

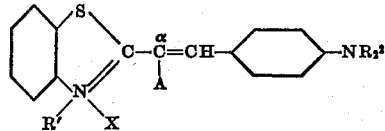

1-p-dialkylamino-α-alkyl (preferably methyl)-styrylbenzothiazole alkyl quaternary salt These compounds are derived from the quaternary salts of substituted benzothiazoles already described above, and the substituent of the reactive 1-methyl group becomes, in the dye, a substituent attached to what is here called the α carbon atom of the styryl group. The dyes are prepared by condensing together (in the usual manner) equimolecular proportions of quaternary salt and p-dialkylaminobenzaldehyde, using one of the lower aliphatic alcohols as a solvent. A trace of a base, such as piperidine, may be used as a catalyst, but it is not essential in all cases.

Examples of a method for preparing the pseudo and iso cyanines, referred to above, are as follows:

Example I

*7-methyl-1',2-diethylthio-ψ-cyanine iodide*

3.2 parts (1 mol.) of 1-ethylbenzothiazole ethiodide (made by condensing equivalent amounts of 1-ethylbenzothiazole and ethyl iodide together in the usual way, and recrystallizing the product), 4.1 parts (1 mol.) of 2-iodoquinoline ethiodide and 18 parts of absolute ethyl alcohol are refluxed together with 2 parts (2 mols) of triethylamine for 15 minutes. Crystals of the dye separate during the reaction and are filtered off on cooling and washed free from a soluble purplish impurity with a little acetone. The dye may be recrystallized from methyl alcohol and is obtained as small scarlet needles which give an orange solution with the solvent.

EXAMPLE II

*7-methyl-2,1'-diethylthioisocyanine iodide*

3.2 parts (1 mol.) of 1-ethylbenzothiazole ethiodide, 5.7 parts (2 mols, 100% excess) of quinoline ethiodide and 20 parts of pyridine are heated together, 2.1 parts (2.1 mols, 110% excess) of triethylamine added to the boiling solution and the whole refluxed for 30 minutes. The dye is precipitated by adding 100 parts of ether, the ethereal layer decanted and the residue washed successively with ether, water and acetone until crimson impurities are removed. The dye may be crystallized from methyl alcohol in which it dissolves with a pinkish-orange solution.

The diagrammatic spectograms constituting the accompanying drawing illustrate the regions of the spectrum to which the various types of dyes herein disclosed will sensitize a gelatino-silver-halide emulsion and the extent of the sensitization at various wave lengths. The figures of this drawing and the dyes, the sensitizing properties of which they illustrate, are as follows—

Fig. 1, 7-methyl-2,1'-diethylthio-ψ-cyanine iodide.

Fig. 2, 7-methyl-2,1'-diethylthio-iso-cyanine iodide. These figures were taken from bromide emulsions.

The sensitization resulting from the various other dyes herein referred to and belonging to the respective classes of dyes above illustrated are all comparable to the sensitization illustrated as resulting from the specific dyes named in connection with these figures.

The preparation of gelatino-silver-halide emulsions is well known to those skilled in the photographic art. To sensitize such emulsions with the dyes herein described, I first prepare a stock solution of the dye by dissolving it in a suitable alcohol, such as methyl alcohol. Then into one liter of a flowable photographic gelatino-silver-halide emulsion I thoroughly incorporate an amount of the above stock solution (diluted somewhat with water, if desired) containing from approximately .04 to about .01 grams of the desired dye. This sensitized emulsion may then be coated upon a suitable support, such as glass, cellulose derivative, paper or the like, to a suitable thickness and allowed to dry, the details of which are well known to photographic experts. Photographic elements so sensitized have properties different from ones heretofore produced with other sensitizing dyes and hence are of special utility.

The amount of dye which is actually incorporated in a given quantity of emulsion will, of course, vary from dye to dye and emulsion to emulsion and the regulation and adoption of the most economical and useful proportions will be apparent to those skilled in the art upon observing the sensitizing power of the particular dye for the particular emulsion in question. The above proportions are, therefore, to be regarded only as illustrative and not to be understood as limiting the invention in any sense. Furthermore, it will be apparent that these dyes may be incorporated in the emulsion by other methods practiced by the art as, for instance, by bathing the plate or film upon which the emulsion has been coated, in a solution of the dye in an appropriate solvent, although this method of incorporating the dye in the emulsion is not to be preferred over that first described. Obviously, the claims are all intended to cover any combination of these dyes with a photographic emulsion whereby the dye exerts a sensitizing effect upon the emulsion.

Under the class of gelatino-silver-halide emulsions I, of course, include all of the silver halides customarily employed in the art but more particularly the silver chloride and silver bromide emulsions. Under the term photographic emulsions I include, not only the gelatino-silver-halide emulsions, but such others as are known to those skilled in the art.

What I claim as my invention and desire to be secured by Letters Patent of the United States is:

1. A gelatino-silver-halide emulsion which contains a dye of the following structure

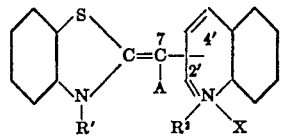

in which R' and R² are alkyl radicals, X is an acid radical and A is an alkyl radical, the quinoline nucleus being linked through either the 2' or 4' position.

2. A gelatino-silver-halide emulsion which contains a dye of the following structure

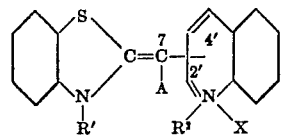

in which R' and R² are alkyl radicals, X is an acid radical and A is a methyl group, the quinoline nucleus being linked through either the 2' or 4' position.

3. A gelatino-silver-halide emulsion which contains a 7-alkyl-1',2-dialkylthio-pseudo-cyanine salt.

4. A gelatino-silver-halide emulsion which contains a 7-methyl-1',2-diethylthio-pseudo-cyanine salt.

5. A gelatino-silver-halide emulsion which contains a 7-methyl-1',2-diethylthio-pseudo-cyanine halide.

6. A gelatino-silver-halide emulsion which contains a 7-methyl-1',2-diethylthio-pseudo-cyanine iodide.

7. A gelatino-silver-halide emulsion which contains a 7-alkyl-1',2-dialkylthio-iso-cyanine salt.

8. A gelatino-silver-halide emulsion which contains a 7-methyl-1',2-diethylthio-iso-cyanine salt.

9. A gelatino-silver-halide emulsion which contains a 7-methyl-1',2-diethylthio-iso-cyanine halide.

10. A gelatino-silver-halide emulsion which contains a 7-methyl-1',2-diethylthio-iso-cyanine iodide.

LESLIE G. S. BROOKER.